United States Patent [19]
Sawada et al.

[11] Patent Number: 5,987,218
[45] Date of Patent: Nov. 16, 1999

[54] IMAGE FORMING APPARATUS

[75] Inventors: Kouichi Sawada; Hideki Morita, both of Hachioji, Japan

[73] Assignee: Konica Corporation, Tokyo, Japan

[21] Appl. No.: 08/823,159

[22] Filed: Mar. 25, 1997

[30] Foreign Application Priority Data

Mar. 29, 1996 [JP] Japan .................................. 8-076057

[51] Int. Cl.⁶ .................................................. G06F 15/00
[52] U.S. Cl. ............................................ 395/102; 395/114
[58] Field of Search ................................... 395/102, 109, 395/107, 112, 114; 347/132, 224, 225, 247, 252, 255; 358/296, 501, 530, 401, 445, 461

[56] References Cited

U.S. PATENT DOCUMENTS 5,029,017  7/1991  Abe et al. .
5,457,489  10/1995  Yamamoto et al. ..................... 347/247

FOREIGN PATENT DOCUMENTS

0658037 A2  6/1995  European Pat. Off. .
0658037     6/1995  Germany ......................... H04N 1/32
62-157070   7/1987  Japan .

OTHER PUBLICATIONS

Patent Abstracts of Japan, vol. 018, No. 343 (P–1761), Jun. 28, 1994 & JP 06 083548 A (Toshiba Corp.) Mar. 25, 1994.

Patent Abstracts of Japan, vol. 011, No. 382 (E–564), Dec. 12, 1987 & JP 62 146066 A (Matsushita Electric Ind., Co., Ltd.), Jun. 30, 1987.

*Primary Examiner*—Phuoc Tran
*Attorney, Agent, or Firm*—Frishauf, Holtz, Goodman, Langer & Chick, P.C.

[57] ABSTRACT

An image forming apparatus includes an image input section for inputting a packed unit of image data corresponding to n pixels, where n is greater than or equal to 2. A clock generating section is provided for generating a first clock having a predetermined period, and a second clock having a predetermined synchronization relation to the first clock and a shorter period than the predetermined period of the first clock. A pixel dividing section is provided for expanding the inputted image data corresponding to n pixels into image data corresponding to one pixel. The pixel dividing section expands the image data corresponding to n pixels in synchronization with the first clock, and an image recording section records an image in a unit of one pixel in synchronization with the second clock in accordance with the expanded image data.

19 Claims, 5 Drawing Sheets

FIG. 2 ( a )
PCLK
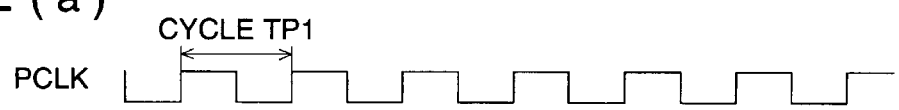
FIG. 2 ( b )
OUTPUT OF CLOCK
GENERATING
SECTION 1
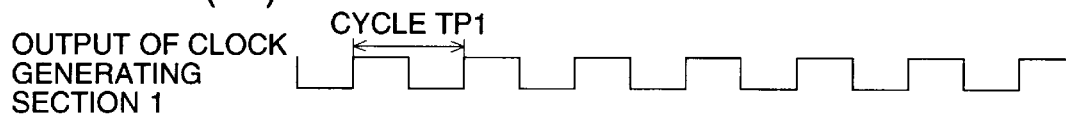
FIG. 2 ( c )
CONT [1:0]
FIG. 2 ( d )
PDATA [7:0]
FIG. 2 ( e )
PWM OUTPUT
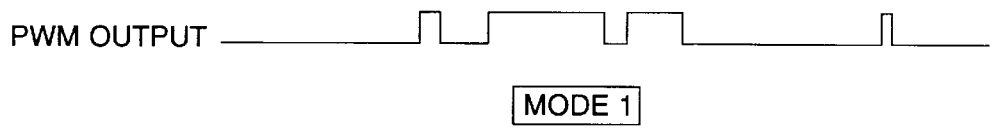
MODE 1

PCLK — CYCLE TP1

D.L OUTPUT

EX-OR OUTPUT

CYCLE TP2

OUTPUT OF CLOCK GENERATING SECTION 1

CONT [1 : 0]

PDATA [7 : 0]

OUTPUT OF PIXEL DIVIDING SECTION

PCP [7 : 0]

PWM OUTPUT

MODE 2

INDEX SIGNAL

LINE EFFECTIVE AREA SIGNAL

1-LINE EFFECTIVE PERIOD

MODE 1

INDEX SIGNAL

LINE EFFECTIVE AREA SIGNAL

1-LINE EFFECTIVE PERIOD    2-LINE EFFECTIVE PERIOD

MODE 2

CALIN

PCLK

CONT [1 : 0]

PDATA [7 : 0]

CALO

TCALOUT

INITIAL SETTING OF PWM 5,987,218

IMAGE FORMING APPARATUS

BACKGROUND OF THE INVENTION

The present invention relates to an image forming apparatus for use in a digital copier, a printer, or similar apparatus, which records data for each pixel.

There is a case, as indicated in FIG. 6, in which a digital copier or a similar apparatus, using, for example, laser beams, comprises a scanner 300, an image processing section 400, and a printer section 100 (See, for example, Japanese Patent Publication Open to Public Inspection No. 157070/1987). The scanner section 300 optically scans a document 200 and converts its image information into an optical image. The optical image is supplied to the image processing section 400, converted into an image signal, and the image signal is image processed in a predetermined manner. Image processing includes enlargement and/or reduction processing, half-toning, outline-processing, and in the case of color composition, color ghost processing, etc. In the printer section 100, an image is recorded according to a digital image signal (pixel data), having a predetermined number of bits, which has been formed in the image processing section 400. When an example of the printer section 100 is shown, an electrophotographic type printer using a photoreceptor drum is used, and laser beams are used as a light source to form an electrostatic latent image on the photoreceptor drum.

In such a digital copier, an increase of copying speed by reduction of image processing time is required. Further, in an apparatus which can be switched between 400 DPI processing and 600 DPI processing, in the case where the image processing section corresponds to, for example, 400 DPI processing, the number of pixels in the scanning line is increased by 1.5 times in the primary scanning direction for 600 DPI processing, and is increased by 2.25 times in the combination of the primary and subsidiary scanning direction. Therefore, it takes much more processing time than does 400 DPI processing, and the copying speed is consequently decreased.

SUMMARY OF THE INVENTION

An object of the present invention is to provide an image forming apparatus in which copying speed is increased, and in which copying speed is not decreased even when the pixel density is increased for image formation in an apparatus in which writing pixel density can be changed.

The above object can be attained by an image forming apparatus comprising:
an image input section for inputting a packed unit of image data corresponding to n pixels, where n is greater than or equal to 2;
a clock generating section for generating a first clock having a predetermined period, and a second clock having a predetermined synchronization relation to the first clock and a shorter period than the predetermined period of the first clock;
a pixel dividing section for expanding the inputted image data corresponding to n pixels into image data corresponding to one pixel; and
an image recording section;
wherein said pixel dividing section expands said image data corresponding to n pixels in synchronization with the first clock, and said image recording section records an image in a unit of one pixel in synchronization with the second clock in accordance with the expanded image data.

BRIEF DESCRIPTION OF THE DRAWINGS

FIGS. 2(a) to 2(e) are timing charts showing a situation from an 8-bit image data input through a PWM signal output in the mode 1.

FIGS. 4(a)-1 to 4(b)-2 are timing charts showing the difference between processing speed in the mode 1 and mode 2.

DETAILED DESCRIPTION OF THE PREFERRED EMBODIMENT

An example of an image forming apparatus of the present invention will be detailed below. In this connection in the example, an image forming apparatus in which writing pixel densities can be switched between several densities, will be described.

Figure 1:
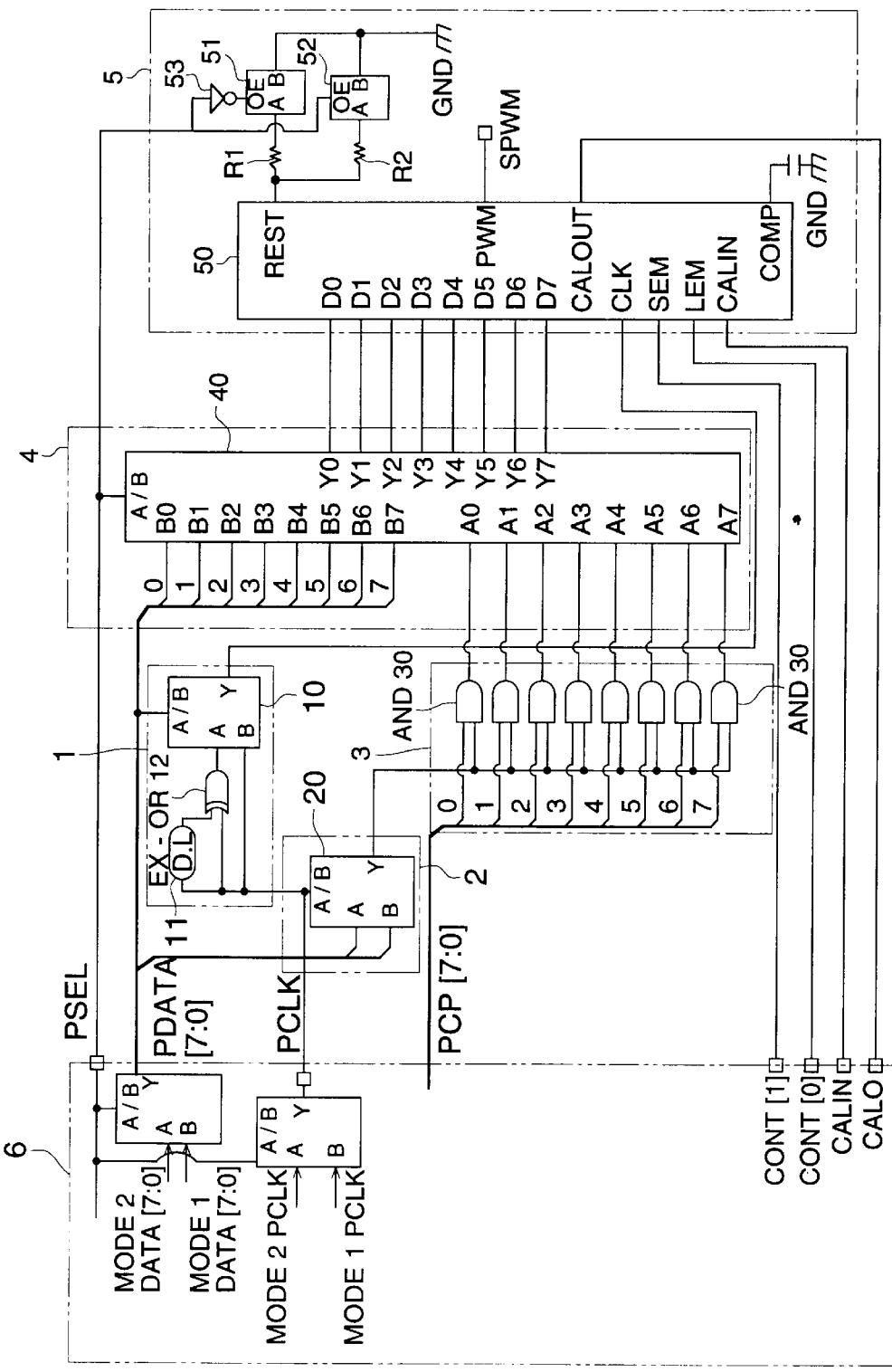
FIG. 1 is a block diagram showing the structure of an image data processing section of a writing system of an image forming apparatus of the present invention.
Figure 3:
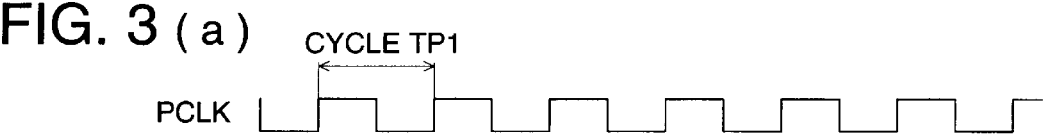
FIGS. 3(a) to 3(i) are timing charts showing a situation from the 8-bit image data input through the PWM signal output in the mode 2.
Figure 3:
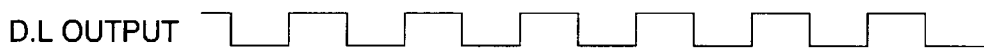
Figure 3:
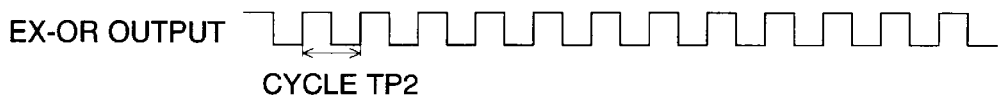
Figure 3:
Figure 3:
Figure 3:
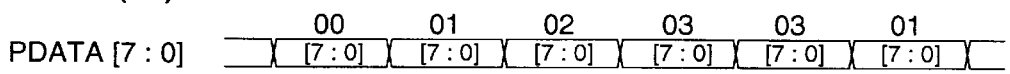
Figure 3:
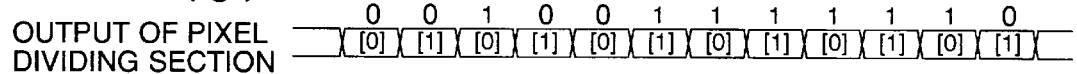
Figure 3:
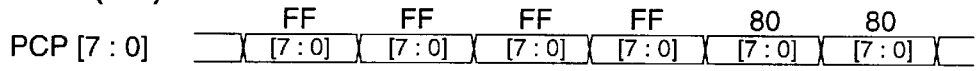
Figure 3:
Figure 4:
Figure 4:
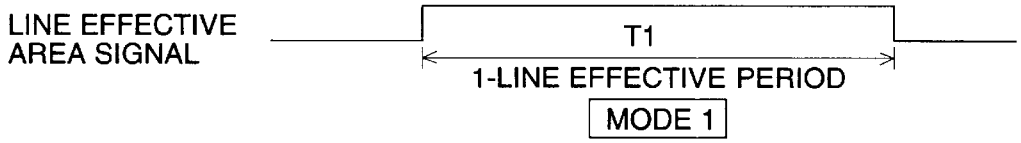
Figure 4:
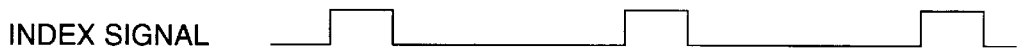
Figure 4:
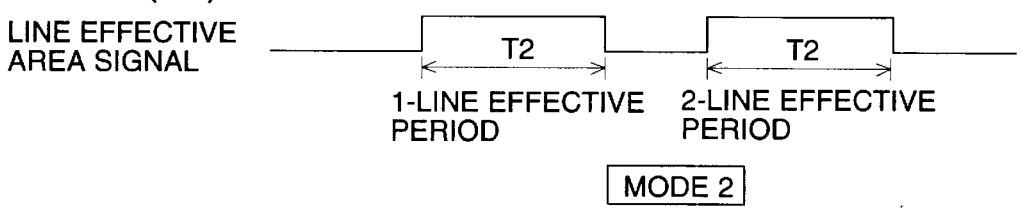
Figure 5:
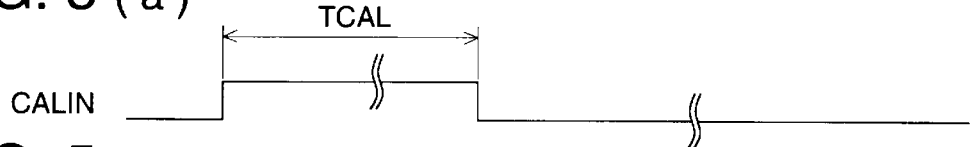
FIGS. 5(a) to 5(e) are timing charts showing initial settings of the PWM characteristics of an PWM IC.
Figure 5:
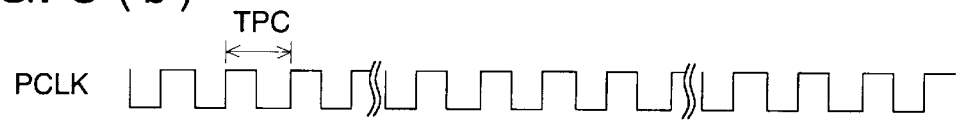
Figure 5:
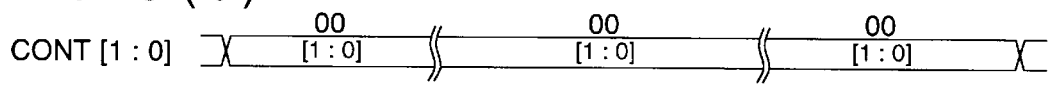
Figure 5:
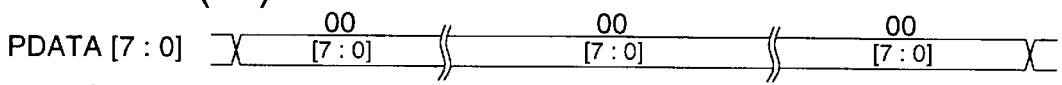
Figure 5:
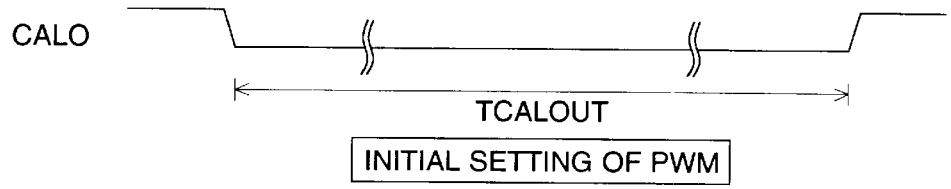
Figure 6:
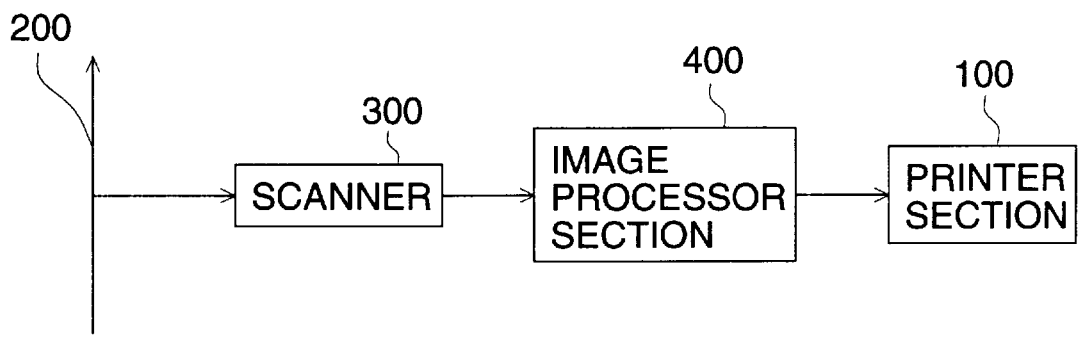
FIG. 6 is a view showing an outline structure of a digital copier.

FIG. 1 is a block diagram showing the structure of an image data processing section of a writing system of an image forming apparatus of the present invention.

In this connection, explanation is omitted for an image processing system 6, in which various image processing operations, such as expansion and contraction processing, and/or packing processing (which will be described later), are conducted on original image data. Many kinds of signals (i.e., a mode selection signal, a reference clock, etc.) other than image data, are also generated by the image processing system. These data and signals are inputted into the image processing section in the writing system through an interface section. Herein, the image processing system may be included in the image forming apparatus, or may be provided outside the image forming apparatus (for example, a printing processing system of data outputted from a computer, etc.).

As a hardware structure of the writing system, the image data processing section is composed of a clock generation section 1, a pixel dividing section 2, a maximum pulse setting section 3, an image data selection section 4 and a PWM section 5. Image data of a plurality of bits, inputted from an image processing system 6, is selectively switched into 2 kinds of image data having respective characteristics, and an image is formed by pulse width modulation.

As 2 types of methods for image formation, there are a mode 1 and a mode 2. The first mode 1 is a method by which an analog modulated pulse width modulation signal SPWM is outputted by pulse width modulating digital image data having 8-bit resolving power. That is, 8-bit image data PDATA [7:0], generated in the image processing system, is sent to the writing system as one pixel data. The writing system pulse width modulates this 8-bit image data PDATA [7:0], and a pulse width modulation signal SPWM is outputted.

The second mode 2 is a method by which a signal, in which 2 pixels of 1-bit image data are packed in 1 pixel of 8-bit image data, is divided again into each 1 pixel of 1-bit image data; this signal is pulse width modulated; and a pulse width modulation signal SPWM is outputted. Two pixels of PDATA [1:0] which have been packed by image data PDATA [7:0], are divided into each 1 pixel of PDATA [1] and of PDATA [0], these data are pulse width modulated, and a pulse width modulation signal SPWM is outputted.

In the above example, the mode is switched by the types of documents and by a setting operation on an operation section. For example, in the case of an image in which gradation is considered important, such as a halftone image like a photograph, the gradation can be reproduced by multi-valued data of 8 bits per each pixel in a mode 1. Further, in the case where binary image data such as a character image is sufficient, 8-bit multi-valued data is not necessary, and as in a mode 2, when more than two pixel image data (to 8-pixel image data at maximum), each pixel image data being composed of 1 bit image data, are packed into 8-bit data, high speed processing can be conducted. Due to this, in the mode 2, recording can be conducted without lowering the speed, even when the pixel density is increased from 400 dpi to 600 dpi in recording.

Next, operations of each section will be described.

Clock Generation Section 1

Clocks for the mode 1 and the mode 2 are generated according to the reference clock PCLK of the writing system, and the clock is selected by a mode select signal PSEL and outputted. Herein, in the case of the mode 1, a clock output section 10 outputs the reference clock PCLK itself, and in the case of the mode 2, the clock output section 10 outputs a clock, which is multiplied by an output EX-OR 12 of a logical operation of EX-OR of the reference clock PCLK and a reference clock, in which the period has been delayed by ½ period by a delay line D.L11.

In this connection, in the case in which frequencies are different for each of the mode 1 and the mode 2, the reference clock PCLK is selected by the mode select signal PSEL corresponding to each mode. Image data PDATA [7:0] is one which is selected from data DATA1 [7:0] of the mode 1, and data DATA2 [7:0] of the mode 2 by the mode select signal PSEL.

Pixel Dividing Section 2

A selection output section 20 respectively selects and outputs image data PDATA [0] and image data PDATA [1] at a Hi level and a Lo level, using the reference clock PCLK of the writing system as a switching signal.

Maximum Pulse Setting Section 3

This section is composed of 8 AND30s which are connected to each data bus of 8-bit image data, 1-bit image data from the pixel dividing section 2 is connected to the respective one input section of the AND30, and a maximum pulse setting signal PCP [7:0] from the image processing system is inputted into another input section of the AND30. The maximum pulse of 1-bit image data is set by the maximum pulse setting signal PCP [7:0].

Data Selecting Section 4

The selection output section 40 selects and outputs either the 8-bit image data of the mode 1, or the maximum pulse setting value of 1-bit image data of the mode 2, by a mode selection signal PSE-L.

PWM Section 5

In this section, digital image data having 8-bit resolving power is pulse width modulated, and a pulse width modulation signal SPWM is generated and outputted, using a single-chip PWMIC50. A laser driving section, not shown, determines the dot forming position and dot length in each pixel based on the signal SPWM. That is, laser beams can be emitted for image formation by generating a laser driving signal by the pulse width modulation.

A resistor R1 and a resistor R2 are resistors to set the PWM characteristics corresponding to an operation frequency, and resistance values respectively corresponding to the mode 1 and the mode 2 are set by resistors R1 and R2. Then, the resistors R1 and R2, which have been set to the mode 1 or the mode 2, are selected by activating or deactivating analog switches 51 and 52 by the mode selection signal PSEL. The signal PSEL is inputted into the analog switch 51 through an inverter INV53. When, for example, the analog switch 52 is activated, the analog switch 51 is deactivated, and their operations are reversed.

As a signal to control the PWMIC50, a clock CLK, a CONT [1:0] signal to determine pulse positions, and a CALIN signal to initially set the PWMIC50, in addition to 8-bit image data, are inputted from the image processing system, and at the initial settings, a CAL0 is outputted as a setting execution signal during the execution of setting.

Next, operations of the modes 1 and 2 will be described.

FIGS. 2(a) to 2(e) are timing charts showing the signals from the 8-bit image data input through the PWM signal output in the mode 1. Each pixel is processed by using the reference clock PCLK having a period of Tp1, as the operation frequency. Each pixel outputs the pulse width modulation signal PWM corresponding to image data PDATA [7:0] according to the pulse position control signal CONT [1:0]. Numerals shown on each signal in the chart express data of each pixel (hexadecimal).

FIGS. 3(a) to 3(i) are timing charts showing the signals from the 8-bit image data input through the PWM signal output in the mode 2. Bits are respectively selected at a Hi level and a Lo level of the reference clock PCLK having a period of TP1; image data PDATA [7:0] is divided into PDATA [0] and PDATA [1]; and the divided image data processes each pixel by using the clock having a period of Tp2, which is acquired by multiplying the period of Tp1 of the reference clock PCLK, as an operation frequency.

1-bit image data PDATA [0] and PDATA [1] set the maximum pulse width by using the maximum pulse setting signal PCP [7:0] which is inputted from the image processing system. The pulse width modulation signal SPWM outputs pulses corresponding to the set values. Numerals shown on signals in the chart express each pixel data (hexadecimal).

As described above, the processing speed of the mode 2 is 2 times that of the mode 1. Further, the system can be structured such that a density correction operation is carried out on data which has been divided into each 1 pixel unit, and the density of expanded pixels is finely adjusted to the optimum density value. When the maximum value of 1-bit image data by packing processing is converted to 8 bits, the maximum pulse width is adjusted so that the optimum and maximum pulse width can be set. The maximum pulse can be adjusted by the accuracy of the 8-bit resolving power, and the maximum pulse can be set so as to have the optimum density.

FIGS. 4(a)-1, 4(a)-2, 4(b)-1 and 4(b)-2 show the difference between processing speeds in the mode 1 and the mode 2 in a timing chart. When a 1-line effective period of each mode is compared to others in a period between an INDEX signal showing a leading reference position of the scanning line, and the next INDEX signal in cases of the same reference clock and the same number of recording pixel, then, two of 1-line effective period T2 of the mode 2 shown in FIGS. 4(b)-1 and 4(b)-2, can exist in the 1-line effective period T1 of the mode 1, shown in FIGS. 4(a)-1 and 4(a)-2, by 2-pixel packing processing, that is, 2-pixel data of the mode 2 exist in 1 pixel of the mode 1. Accordingly, the 1-line effective period T2 of the mode 2 is ½ of the 1-line effective period T1 of the mode 1. This shows that the mode 2 can carry out image formation at twice the processing speed of the mode 1.

FIGS. 5(a) to 5(e) are timing charts showing the initial settings of the PWM characteristic of a PWMIC. Initial setting is started by using a CALIN signal having a predetermined pulse width Tcal as a trigger signal, and a CALO signal is at the Lo level during an initial setting execution period Tcalout. A pulse position control signal CONT [1:0] and the image data PDATA [7:0] are fixed at a Lo level or Hi level in order to maintain the setting accuracy during execution of the initial settings, and fluctuations of voltage or the like, generated by changes of data, are prevented. A clock Tpc is the operation clock in each mode. Numerals shown on signals in the chart are data (hexadecimal) of each pixel.

Incidentally, in the example shown in FIGS. 1 through 5, the circuit to switch the modes 1 and 2 was described. Even in a circuit structure of the mode 2, structured so as to have no image data selection section 4, an output speed of 2 times of the operation clock of the image processing system 6 can be obtained.

As described above, according to example of the present invention, after image data for a plurality of pixels, obtained from image processing, have been packed in the pixels, the number of which is that of one scanning line, each pixel is expanded by clock pulses, the number of which is multiplied by the number of packed pixels, and thereby processing time for the image formation can be reduced to 1/(the number of packed pixels). Further, it is not necessary to adjust or to increase the processing speed for a load of the image processing section, and therefore, the operation clock pulses of the circuit structure itself, of the image processing section, can be used for the process, and the structure is simple, and the cost is low.

Further, an image effective signal width of one line in the image input section is structured to be 1/n of the number of pixels for one line which is printed by a laser printer. When the number of pixels of one scanning line is the same, the image can be formed by 1/n processing time.

Further, a laser driving signal is generated by pulse width modulation, and thereby, the image is formed by converting the image data, which has been division-processed, into image data with the number of bits before the division processing.

Further, density correction can be carried out on the data which has been divided into each one pixel unit. Thus, the density of the expanded pixels can be finely adjusted to the optimum density value.

Further, the maximum pulse can be adjusted with the accuracy of 8-bit resolving power, and the maximum pulse can be set so as to have the optimum density.

Further, copying speed is not reduced, and image formation having different writing densities can be realized by selection of the writing density. Further, in this case, it is not necessary to adjust nor to increase the processing speed for a load of the image processing section. As a result, the operation clock pulses of the circuit structure itself, of the image processing section, can be used for the process, and the structure is simple and the cost is low.

Further, resistance values may be used to set the characteristics of the pulse width modulation, and the formation of images having different writing densities can be realized.

Further, the durability of the system may be increased by using an analog switch for switching the resistance values.

What is claimed is:

1. An image forming apparatus comprising:
   an image input section for inputting a packed unit of image data corresponding to n pixels, where n is greater than or equal to 2;
   a clock generating section for generating a first clock having a predetermined period, and a second clock having a period of 1/n times the predetermined period of the first clock;
   a pixel dividing section for expanding the inputted image data corresponding to n pixels into image data corresponding to one pixel; and
   an image recording section;
   wherein said pixel dividing section expands said image data corresponding to n pixels in synchronization with the first clock, and said image recording section records an image in a unit of one pixel in synchronization with the second clock in accordance with the expanded image data.

2. The image forming apparatus of claim 1, wherein the second clock has a frequency of n times a frequency of the first clock.

3. The image forming apparatus of claim 1, wherein the image recording section comprises a laser for recording images, and a drive signal of the laser is formed in synchronization with the second clock in accordance with the expanded image data.

4. The image forming apparatus of claim 1, wherein one line effective period in the image input section is reduced to 1/n of one line effective period in the image recording section.

5. The image forming apparatus of claim 3, wherein the driving signal for the laser is generated by a pulse width modulation.

6. The image forming apparatus of claim 1, further comprising a maximum pulse setting section for adding image density information to the expanded image data, and wherein the expanded image data to which the image density information has been added is inputted to the image recording section.

7. The image forming apparatus of claim 6, wherein the inputted image data is divided into image data corresponding to n pixels and having a plurality of bits M, the image density information is formed by the plurality of bits M, and an image density of the expanded image data is corrected by means of a logical product processing operation performed with the expanded image data.

8. The image forming apparatus of claim 6, further comprising a switch for switching a resistance value to set a characteristic of a pulse width modulation between a value appropriate for a frequency of the first clock and a value appropriate for a frequency of the second clock, and wherein the frequency of the second clock is n times the frequency of the first clock.

9. The image forming apparatus of claim 6, further comprising an analog switch for switching a resistance value.

10. The image forming apparatus of claim 1, further comprising an image processing section packing image data corresponding to n pixels to form the packed input unit of image data.

11. An image forming apparatus comprising:
    an image input section for inputting image data having a unit of a plurality bits;
    a clock generating section for generating a first clock having a predetermined period and a second clock having a period of 1/n times the predetermined period of the first clock;

a pixel dividing section for expanding the inputted image data corresponding to n pixels which have been packed into image data corresponding to one pixel, where n is greater than or equal to 2;

an image recording section; and a circuit for selecting between a first mode in which the image data inputted to the image input section are directly sent to the image recording section as image data for one pixel in synchronization with the first clock, and a second mode in which the image data inputted to the image input section is expanded by the pixel dividing section into image data for one pixel in synchronization with the first clock and then sent to the image recording section;

wherein when the first mode is selected, the image recording section records an image in a unit of one pixel in synchronization with the first clock in accordance with the image data inputted to the image input section, and when the second mode is selected, the image recording section records an image in a unit of one pixel in synchronization with the second clock in accordance with the expanded image data.

12. The image forming apparatus of claim 11, further comprising an image data selection section for receiving both first image data from the image input section and second image data sent through the pixel dividing section, and for sending either the first image data or the second image data in accordance with one of the first mode and the second mode to the image recording section.

13. The image forming apparatus of claim 11, wherein the second clock has a frequency of n times a frequency of the first clock.

14. The image forming apparatus of claim 11, wherein the image recording section comprises a laser for recording images, and a drive signal of the laser is formed in synchronization with the second clock in accordance with the expanded image data.

15. The image forming apparatus of claim 11, wherein one line effective period in the image input section is reduced to 1/n of one line effective period in the image recording section.

16. The image forming apparatus of claim 14, wherein the driving signal for the laser is generated by a pulse width modulation.

17. The image forming apparatus of claim 11, further comprising a maximum pulse setting section for adding image density information to the expanded image data, and wherein the expanded image data to which the image density information has been added is inputted to the image recording section.

18. The image forming apparatus of claim 17, wherein the inputted image data is divided into image data corresponding to n pixels and having a plurality of bits M, the image density information is formed by the plurality of bits M, and an image density of the expanded image data is corrected by means of a logical product processing operation performed with the expanded image data.

19. The image forming apparatus of claim 11, further comprising an image processing section packing image data corresponding to n pixels to form the packed input unit of image data.

* * * * *